(12) United States Patent
Kim

(10) Patent No.: US 11,290,655 B1
(45) Date of Patent: Mar. 29, 2022

(54) IMAGE SENSING DEVICE

(71) Applicant: SK hynix Inc., Gyeonggi-do (KR)

(72) Inventor: Dong Ik Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/333,786

(22) Filed: May 28, 2021

(30) Foreign Application Priority Data

Dec. 14, 2020 (KR) .................. 10-2020-0174188

(51) Int. Cl.
*H04N 5/235* (2006.01)
*H04N 5/232* (2006.01)
*H04N 9/04* (2006.01)

(52) U.S. Cl.
CPC ....... *H04N 5/2355* (2013.01); *H04N 5/23229* (2013.01); *H04N 9/0455* (2018.08)

(58) Field of Classification Search
CPC ............. H04N 5/2355; H04N 5/23229; H04N 9/0455; H04N 5/37452; G03B 11/00; G06F 8/10
See application file for complete search history.

(56) References Cited

U.S. PATENT DOCUMENTS

| 8,345,144 | B1 * | 1/2013 | Georgiev ............... G03B 11/00 348/340 |
| 9,218,653 | B2 | 12/2015 | Prabhudesai et al. |
| 2020/0068151 | A1 * | 2/2020 | Pourreza Shahri ..... G06T 5/002 |
| 2020/0382727 | A1 * | 12/2020 | Nishihara .......... H04N 5/37452 |
| 2021/0150247 | A1 * | 5/2021 | Kuo ...................... G06K 9/3258 |
| 2021/0157551 | A1 * | 5/2021 | Bliss ......................... G06F 8/10 |
| 2021/0211163 | A1 * | 7/2021 | Ait Aoudia ........... H03M 1/201 |

* cited by examiner

*Primary Examiner* — Hung H Lam
(74) *Attorney, Agent, or Firm* — IP & T Group LLP

(57) ABSTRACT

Disclosed is an image sensing device including a sampling module suitable for generating for each color, a plurality of images having different exposure times, based on a single image generated during a single frame time; a correction module suitable for learning correction parameters of the single image based on the plurality of images using a set learning algorithm, and generating a plurality of corrected images by removing the correction parameters from the plurality of images; and an image processing module suitable for generating a high dynamic range image corresponding to the single image, based on the plurality of corrected images.

20 Claims, 7 Drawing Sheets

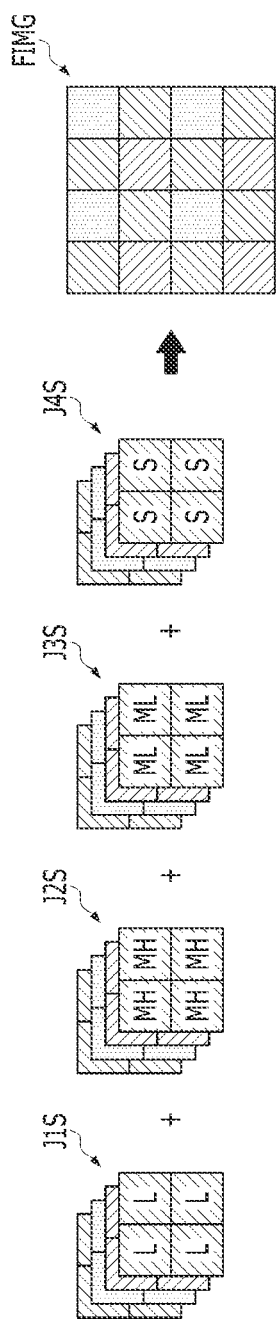

IMAGE SENSING DEVICE

CROSS-REFERENCE TO RELATED APPLICATION(S)

This application claims priority under 35 U.S.C. § 119 to Korean Patent Application No. 10-2020-0174188, filed on Dec. 14, 2020, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices are generally classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device that may generate a high dynamic range image based on deep learning.

In accordance with an embodiment of the present disclosure, an image sensing device may include: a sampling module suitable for generating for each color, a plurality of images having different exposure times, based on a single image generated during a single frame time; a correction module suitable for learning correction parameters of the single image based on the plurality of images using a set learning algorithm, and generating a plurality of corrected images by removing the correction parameters from the plurality of images; and an image processing module suitable for generating a high dynamic range image corresponding to the single image, based on the plurality of corrected images.

The correction parameters may include noise components and ghost components.

The correction module may include: a denoise module suitable for learning a noise component of each of the plurality of images based on the plurality of images using a first learning algorithm, and generating a plurality of denoised images by removing the noise component from each of the plurality of images; a calculation module suitable for generating a plurality of gray images based on the plurality of denoised images and weights for each color; and a deghost module suitable for learning a ghost component of each of the plurality of gray images based on the plurality of gray images using a second learning algorithm, and generating the plurality of corrected images by removing the noise component from each of the plurality of gray images.

In accordance with an embodiment of the present disclosure, an image sensing device may include: an image sensor including a pixel array having color filters arranged in a quad pattern and controlled according to different exposure times for each pattern, and suitable for generating a single image corresponding to the quad pattern during a single frame time; and an image processor suitable for learning, for each color, correction parameters based on the single image and a set learning algorithm, and generating a high dynamic range image having a Bayer pattern, based on the correction parameters.

The correction parameters may include noise components and ghost components.

The single image may have a quad pattern, and the high dynamic range image may have a Bayer pattern.

In accordance with an embodiment of the present disclosure, an image sensing device may include: a sampling module suitable for receiving a quad pattern image and sampling the quad pattern image according to color channels to generate a plurality of channel images; a denoising module suitable for generating a plurality of denoised channel images, each denoised channel image generated by learning using a pair of images of own and another channels, the another channel associated with a relatively high exposure time; a deghosting module suitable for generating a plurality of deghosted channel images, each deghosted channel it mage generated by learning using a pair of images of own and another select channels, the another select channel associated with a lowest exposure time; and an image processing module suitable for generating an output image with a Bayer pattern based on the plurality of deghosted channel images.

BRIEF DESCRIPTION OF THE DRAWINGS

FIGS. 9 to 12 are diagrams illustrating an operation of the image sensing device illustrated in FIG. 1.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the dement may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular form, but the present disclosure is not limited thereto, and it will be understood that the components may be formed in plural.

Figure 1:
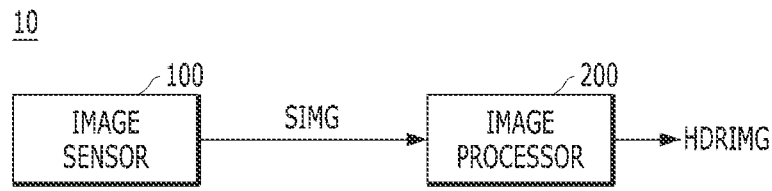
FIG. 1 is a block diagram illustrating an image sensing device in accordance with an embodiment of the present disclosure.

FIG. 1 is a block diagram illustrating an image sensing device 10 in accordance with an embodiment of the present disclosure.

Referring to FIG. 1, the image sensing device 10 may include an image sensor 100 and an image processor 200.

The image sensor 100 may generate a single image SIMG during a single frame time. For example, the image sensor 100 may include a pixel array having color filters arranged in a quad pattern, and generate the single image SIMG corresponding to the quad pattern.

The image processor 200 may generate an image having a high dynamic range (hereinafter referred to as an "HDR image") HDRIMG based on the single image SIMG using a learning algorithm related to deep learning. For example, the image processor 200 may learn correction parameters for each color based on the single image SIMG using the learning algorithm, and generate the HDR image HDRIMG having a Bayer pattern, based on the correction parameters. The correction parameters may include noise components and ghost components.

Figure 2:
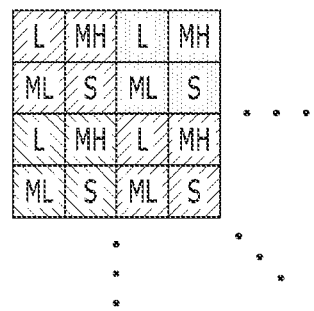
FIG. 2 is a diagram illustrating an example of a pixel array included in an image sensor illustrated in FIG. 1.

FIG. 2 is a diagram illustrating an example of the pixel array included in the image sensor 100 illustrated in FIG. 1.

Referring to FIG. 2, the pixel array may include a plurality of pixels arranged according to the quad pattern. The quad pattern represents a pattern in which pixels having the same color filter are arranged in a 2×2 unit. For example, first pixels in the 2×2 unit arranged in first and second rows and first and second columns may each have a green color filter, second pixels in the 2×2 unit arranged in the first and second rows and third and fourth columns may each have a red color filter, third pixels in the 2×2 unit arranged in third and fourth rows and the first and second columns may each have a blue color filter, and fourth pixels in the 2×2 unit arranged in the third and fourth rows and the third and fourth columns may each have a green color filter.

The pixel array may be controlled according to different exposure times for each quad pattern. For example, among the first pixels, a pixel disposed on an upper left may be controlled according to a first exposure time L and generate an image value corresponding to charges accumulated during the first exposure time L. Further, a pixel disposed on an upper right may be controlled according to a second exposure time MH and generate an image value corresponding to charges accumulated during the second exposure time MH, Furthermore, a pixel disposed on a lower left may be controlled according to a third exposure time ML and generate an image value corresponding to charges accumulated during the third exposure time ML. Furthermore, a pixel disposed on a lower right may be controlled according to a fourth exposure time S and generate an image value corresponding to charges accumulated during the fourth exposure time S. The first exposure time L may be the longest exposure time among the first to fourth exposure times L, MH, ML and S. The second exposure time MH may be shorter than the first exposure time L, The third exposure time ML may be shorter than the second exposure time MH. The fourth exposure time S may be the shortest exposure time among the first to fourth exposure times L, MH, ML and S. The second to fourth pixels may be controlled according to the first to fourth exposure times L, MH, ML and S in the same manner as the first pixels.

Figure 3:
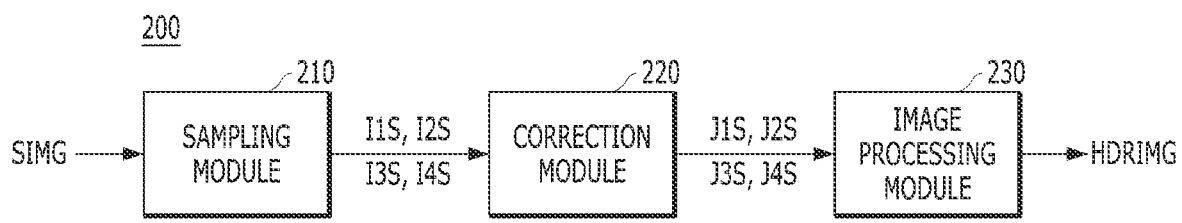
FIG. 3 is a block diagram illustrating an image processor illustrated in FIG. 1.

FIG. 3 is a block diagram illustrating the image processor 200 illustrated in FIG. 1.

Referring to FIG. 3, the image processor 200 may include a sampling module 210, a correction module 220 and an image processing module 230.

The sampling module 210 may generate, for each color, first to fourth images I1S, I2S, I3S and I4S corresponding to the first to fourth exposure times L, MH, ML and S, respectively, based on the single image SIMG generated during the single frame time.

The correction module 220 may learn the correction parameters of the single image SIMG based on the first to fourth images I1S, I2S, I3S and I4S using the learning algorithm. Further, the correction module 220 may generate first to fourth corrected images J1S, J2S, J3S and J4S by removing the correction parameters from the first to fourth images I1S, I2S, I3S and I4S, respectively.

The image processing module 230 may generate the HDR image HDRIMG corresponding to the single image SIMG, based on the first to fourth corrected images J1S, J2S, J3S and J4S.

Figure 4:
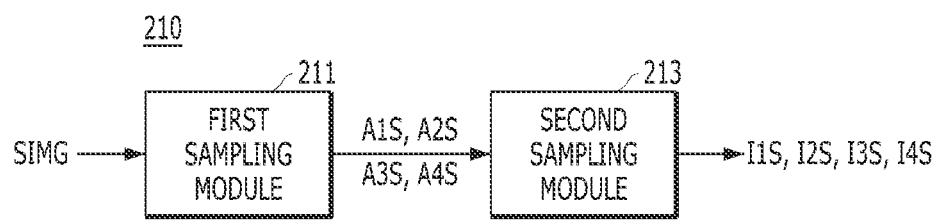
FIG. 4 is a block diagram illustrating a sampling module illustrated in FIG. 3.

FIG. 4 is a block diagram illustrating the sampling module 210 illustrated in FIG. 3.

Referring to FIG. 4, the sampling module 210 may include a first sampling module 211 and a second sampling module 213.

The first sampling module 211 may sample, for each exposure time, image values included in the single image SIMG, and generate first to fourth sampled images A1S, A2S, A3S and A4S.

The second sampling module 213 may sample, for each color, image values included in the first to fourth sampled images A1S, A2S, A3S and A4S, and generate the first to fourth images I1S, I2S, I3S and I4S.

Figure 5:
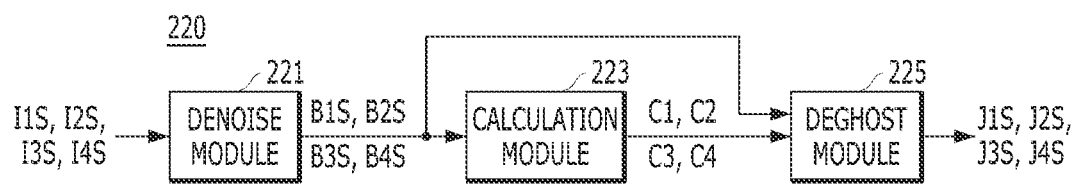
FIG. 5 is a block diagram illustrating a correction module illustrated in FIG. 3.

FIG. 5 is a block diagram illustrating the correction module 220 illustrated in FIG. 3.

Referring to FIG. 5, the correction module 220 may include a denoise module 221, a calculation module 223 and a deghost module 225.

The denoise module 221 may learn first to fourth noise components of the first to fourth images I1S, I2S, I3S and I4S based on the first to fourth images I1S, I2S, I3S and I4S using a first learning algorithm. The first learning algorithm may be an algorithm using one of a U-Net model, a VGGnet model and a Resnet model. The denoise module 221 may generate first to fourth denoised images B1S, B2S, B3S and B4S by removing the first to fourth noise components from the first to fourth images I1S, I2S, I3S and I4S, respectively.

The calculation module 223 may generate first to fourth gray images C1, C2, C3 and C4 based on the first to fourth denoised images B1S, B2S, B3S and B4S and weights preset for each color. For example, the calculation module 223 may generate the first gray image C1 based on the first denoised images BLS and a weight corresponding to a first green color. Further, the calculation module 223 may generate the second gray image C2 based on the second denoised images B2S and a weight corresponding to a red color. Furthermore, the calculation module 223 may generate the third gray image C3 based on the third denoised images B3S and a weight corresponding to a blue color. Furthermore, the calculation module 223 may generate the fourth gray image C4 based on the fourth denoised images B4S and a weight corresponding to a second green color. The weight corresponding to the first green color and the weight corresponding to the second green color may be the same as or different from each other, depending on design.

The deghost module 225 may learn first to fourth ghost components of the first to fourth gray images C1, C2, C3 and C4 based on the first to fourth gray images C1, C2, C3 and C4 and the first to fourth denoised images B1S, B2S, B3S and B4S using a second learning algorithm. The second learning algorithm may be an algorithm using one of a U-Net model, a VGGnet model and a Resnet model. The deghost module 225 may generate the first to fourth corrected images J1S, J2S, J3S and J4S by removing the first to fourth ghost components from the first to fourth gray images C1, C2, C3 and C4, respectively.

Figure 6:
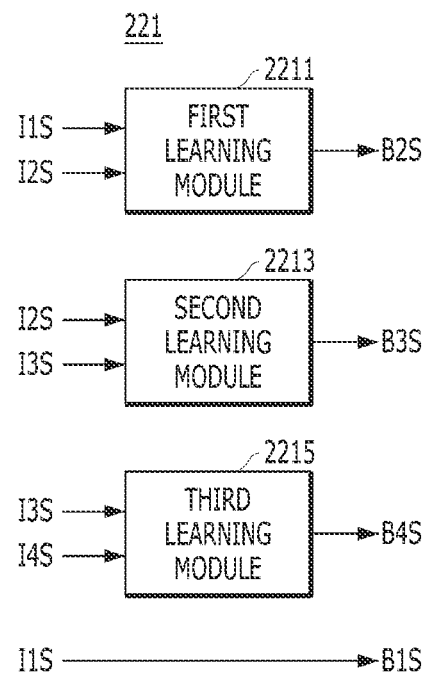
FIG. 6 is a block diagram Illustrating a denoise module illustrated in FIG. 5.

FIG. 6 is a block diagram illustrating the denoise module 221 illustrated in FIG. 5.

Referring to FIG. 6, the denoise module 221 may include a first learning module 2211, a second learning module 2213 and a third learning module 2215.

The first learning module 2211 may generate the second denoised images B2S corresponding to the second images I2S, based on the first images I1S and the second images I2S. The first learning module 2211 may learn the second noise components corresponding to the respective second images I2S by using the first images I1S as labels and using the second images I2S as input data. The first learning module 2211 may generate and use a first saturation map corresponding to the first images I1S, when learning the second noise components. For example, the first learning module 2211 may generate the first saturation map based on the first images I1S, recognize saturated image values among image values included in the first images I1S, based on the first saturation map, and exclude, when learning the second noise components, image values corresponding to the saturated image values, among image values included in the second images I2S. The first learning module 2211 may scale the second images I2S based on a first exposure ratio, before learning the second noise components. For example, the first exposure ratio is calculated according to Equation 1 below:

$$ER1 = \frac{VL}{VMH} \quad \text{[Equation 1]}$$

Herein, "ER1" represents the first exposure ratio, "VL" represents an image value included in each of the first images I1S, and "VMH" represents an image value included in each of the second images I2S.

The second learning module 2213 may generate the third denoised images B3S corresponding to the third images I3S, based on the second images I2S and the third images I3S. The second learning module 2213 may learn the third noise components corresponding to the respective third images I3S by using the second images I2S as labels and using the third images I3S as input data. The second learning module 2213 may generate and use a second saturation map corresponding to the second images I2S, when learning the third noise components. For example, the second learning module 2213 may generate the second saturation map based on the second images I2S, recognize saturated image values among image values included in the second images I2S, based on the second saturation map, and exclude, when learning the third noise components, image values corresponding to the saturated image values, among image values included in the third images I3S. The second learning module 2213 may scale the third images I3S based on a second exposure ratio, before learning the third noise components. For example, the second exposure ratio is calculated according to Equation 2 below:

$$ER2 = \frac{VMH}{VML} \quad \text{[Equation 2]}$$

Herein, "ER2" represents the second exposure ratio, "VMH" represents an image value included in each of the second images I2S, and "VML" represents an image value included in each of the third images I3S.

The third learning module 2215 may generate the fourth denoised images B4S corresponding to the fourth images I4S, based on the third images I3S and the fourth images I4S. The third learning module 2215 may learn the fourth noise components corresponding to the respective fourth images I4S by using the third images I3S as labels and using the fourth images I4S as input data. The third learning module 2215 may generate and use a third saturation map corresponding to the third images I3S, when learning the fourth noise components. For example, the third learning module 2215 may generate the third saturation map based on the third images I3S, recognize saturated image values among image values included in the third images I3S, based on the third saturation map, and exclude, when learning the fourth noise components, image values corresponding to the saturated image values, among image values included in the fourth images I4S. The third learning module 2215 may scale the fourth images I4S based on a third exposure ratio, before learning the fourth noise components. For example, the third exposure ratio is calculated according to Equation 3 below:

$$ER3 = \frac{VML}{VS} \quad \text{[Equation 3]}$$

Herein, "ER3" represents the third exposure ratio, "VML" represents an image value included in each of the third images I3s, and "VS" represents an image value included in each of the fourth images I4S.

The denoise module 221 may generate, i.e., output the first images I1S as the first denoised images B1S. In this case, the denoise module 221 does not need to learn the first noise components.

Figure 7:
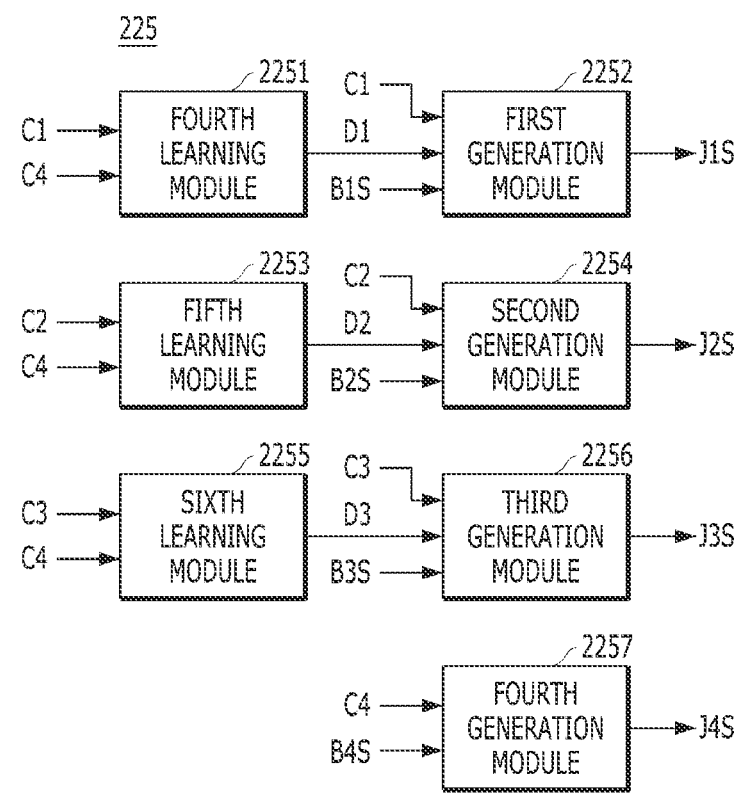
FIG. 7 is a block diagram illustrating a deghost module illustrated in FIG. 5.

FIG. 7 is a block diagram illustrating the deghost module 225 illustrated in FIG. 5.

Referring to FIG. 7, the deghost module 225 may include a fourth learning module 2251, a first generation module 2252, a fifth learning module 2253, a second generation module 2254, a sixth learning module 2255, a third generation module 2256 and a fourth generation module 2257.

The fourth learning module 2251 may generate a first corrected gray image D1 corresponding to the first gray image C1, based on the fourth gray image C4 having the fourth exposure time S and the first gray image C1 having the first exposure time L. The fourth learning module 2251 may learn the first ghost component of the first gray image C1 by using the fourth gray image C4 as a label and using the first gray image C1 as input data. The fourth learning module 2251 may generate and use a fourth saturation map corresponding to the first gray image C1, when learning the first ghost component of the first gray image C1. For example, the fourth learning module 2251 may generate the fourth saturation map based on the first gray image C1, and exclude, when learning the first ghost component, saturated image values among image values included in the first gray image C1, based on the fourth saturation map. The fourth learning module 2251 may scale the first gray image C1 based on a fourth exposure ratio, before learning the first ghost component. The fourth exposure ratio is calculated according to Equation 4 below:

$$ER4 = \frac{GVL}{GVS} \quad \text{[Equation 4]}$$

Herein, "ER4" represents the fourth exposure ratio, "GVL" represents an image value included in the first gray image C1, and "GVS" represents an image value included in the fourth gray image C4.

The first generation module 2252 may generate the first corrected images J1S having the first exposure time L for each color, based on the first corrected gray image D1, the first gray image C1 and the first denoised images B1S. For example, the first corrected images J1S may include images each corresponding to the first green color and having the first exposure time L. Further, the first corrected images J1S may include images each corresponding to the red color and having the first exposure time L. Furthermore, the first corrected images J1s may include images each corresponding to the blue color and having the first exposure time L, and images each corresponding to the second green color and having the first exposure time L. For example, the first generation module 2252 may generate the first corrected images J1S according to Equation 5 below:

$$J1S = B1S*(D1/C1) \quad \text{[Equation 5]}$$

The fifth learning module 2253 may generate a second corrected gray image D2 corresponding to the second gray image C2, based on the fourth gray image C4 having the fourth exposure time S and the second gray image C2 having the second exposure time MH. The fifth learning module 2253 may learn the second ghost component of the second gray image C2 by using the fourth gray image C4 as a label and using the second gray image C2 as input data. The fifth learning module 2253 may generate and use a fifth saturation map corresponding to the second gray image C2, when learning the second ghost component of the second gray image C2, For example, the fifth learning module 2253 may generate the fifth saturation map based on the second gray image C2, and exclude, when learning the second ghost component, saturated image values among image values included in the second gray image C2, based on the fifth saturation map. The fifth learning module 2253 may scale the second gray image C2 based on a fifth exposure ratio, before learning the second ghost component. The fifth exposure ratio is calculated according to Equation 6 below:

$$ER5 = \frac{GVMH}{GVS} \quad \text{[Equation 6]}$$

Herein, "ER5" represents the fifth exposure ratio, "GVMH" represents an image value included in the second gray image C2, and "GVS" represents an image value included in the fourth gray image C4.

The second generation module 2254 may generate the second corrected images J2S having the second exposure time MH for each color, based on the second corrected gray image D2, the second gray image C2 and the second denoised images B2S. For example, the second corrected images J2S may include images each corresponding to the first green color and having the second exposure time MH. Further, the second corrected images J2S may include images each corresponding to the red color and having the second exposure time MH, Furthermore, the second corrected images J2S may include images each corresponding to the blue color and having the second exposure time MH. Furthermore, the second corrected images J2S may include images each corresponding to the second green color and each having the second exposure time MH. For example, the second generation module 2254 may generate the second corrected images J2S according to Equation 7 below:

$$J2S = B2S*(D2/C2) \quad \text{[Equation 7]}$$

The sixth learning module 2255 may generate a third corrected gray image D3 corresponding to the third gray image C3, based on the fourth gray image C4 having the fourth exposure time S and the third gray image C3 having the third exposure time ML. The sixth learning module 2255 may learn the third ghost component of the third gray image C3 by using the fourth gray image C4 as a label and using the third gray image C3 as input data. The sixth learning module 2255 may generate and use a sixth saturation map corresponding to the third gray image C3, when learning the third ghost component of the third gray image C3. For example, the sixth learning module 2255 may exclude, when learning the third ghost component, saturated image values among image values included in the third gray image C3, based on the sixth saturation map. The sixth learning module 2255 may scale the third gray image C3 based on a sixth exposure ratio, before learning the third ghost component. The sixth exposure ratio is calculated according to Equation 8 below:

$$ER6 = \frac{GVML}{GVS} \quad \text{[Equation 8]}$$

Herein, "ER6" represents the sixth exposure ratio, "GVML" represents an image value included in the third gray image C3, and "GVS" represents an image value included in the fourth gray image C4.

The third generation module 2256 may generate the third corrected images J3S having the third exposure time ML for each color, based on the third corrected gray image D3, the third gray image C3 and the third denoised images 635. For example, the third corrected images J3S may include images each corresponding to the first green color and having the third exposure time ML. Further, the third corrected images J3S may include images each corresponding to the red color and having the third exposure time ML. Furthermore, the third corrected images J3S may include images each corresponding to the blue color and having the third exposure time ML. Furthermore, the third corrected images J3S may include images each corresponding to the second green color and each having the third exposure time ML. For example, the third generation module 2256 may generate the third corrected images J3S according to Equation 9 below:

$$J3S = B3S*(D3/C3) \quad \text{[Equation 9]}$$

The fourth generation module 2257 may generate the fourth corrected images J4S having the fourth exposure time S for each color, based on the fourth gray image C4 and the fourth denoised images B4s. For example, the fourth corrected images J4s may include images each corresponding to the first green color and having the fourth exposure time S. Further, the fourth corrected images J4s may include images each corresponding to the red color and having the fourth exposure time S. Furthermore, the fourth corrected images J4s may include images each corresponding to the blue color and having the fourth exposure time S. Furthermore, the fourth corrected images J4s may include images each corresponding to the second green color and having the fourth exposure time S. For example, the fourth generation module 2257 may generate the fourth corrected images J4S according to Equation 10 below:

$$J4S = B4S * (D4/C4)$$ [Equation 10]

The deghost module 225 may use the fourth gray image C4 as a fourth corrected gray image. In this case, the deghost module 225 does not need to learn the fourth ghost component.

Figure 8:
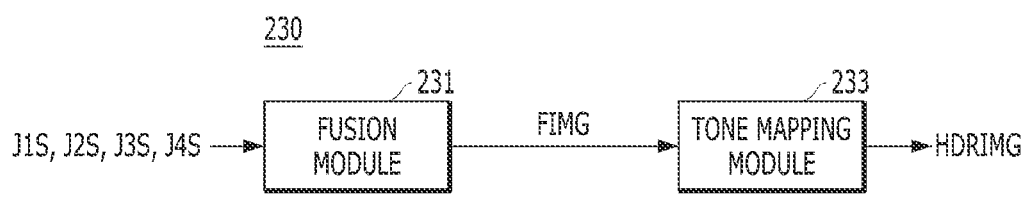
FIG. 8 is a block diagram illustrating an image processing module illustrated in FIG. 3.

FIG. 8 is a block diagram illustrating the image processing module 230 illustrated in FIG. 3.

Referring to FIG. 8, the image processing module 230 may include a fusion module 231 and a tone mapping module 233.

The fusion module 231 may generate a single fusion image FIMG by synthesizing the first to fourth corrected images J1S, J2S, J3S and J4S for each color. For example, the single fusion image FIMG may have the Bayer pattern.

The tone mapping module 233 may generate the HDR image HDRIMG based on the single fusion image FIMG.

Hereinafter, an operation of the image sensing device 10 in accordance with an embodiment of the present disclosure, which has the above-described configuration, is described with reference to FIGS. 9 to 12. By way of example, the present embodiment describes the single image SIMG corresponding to 8×8 pixels which is generated by the image sensor 100.

Figure 9:
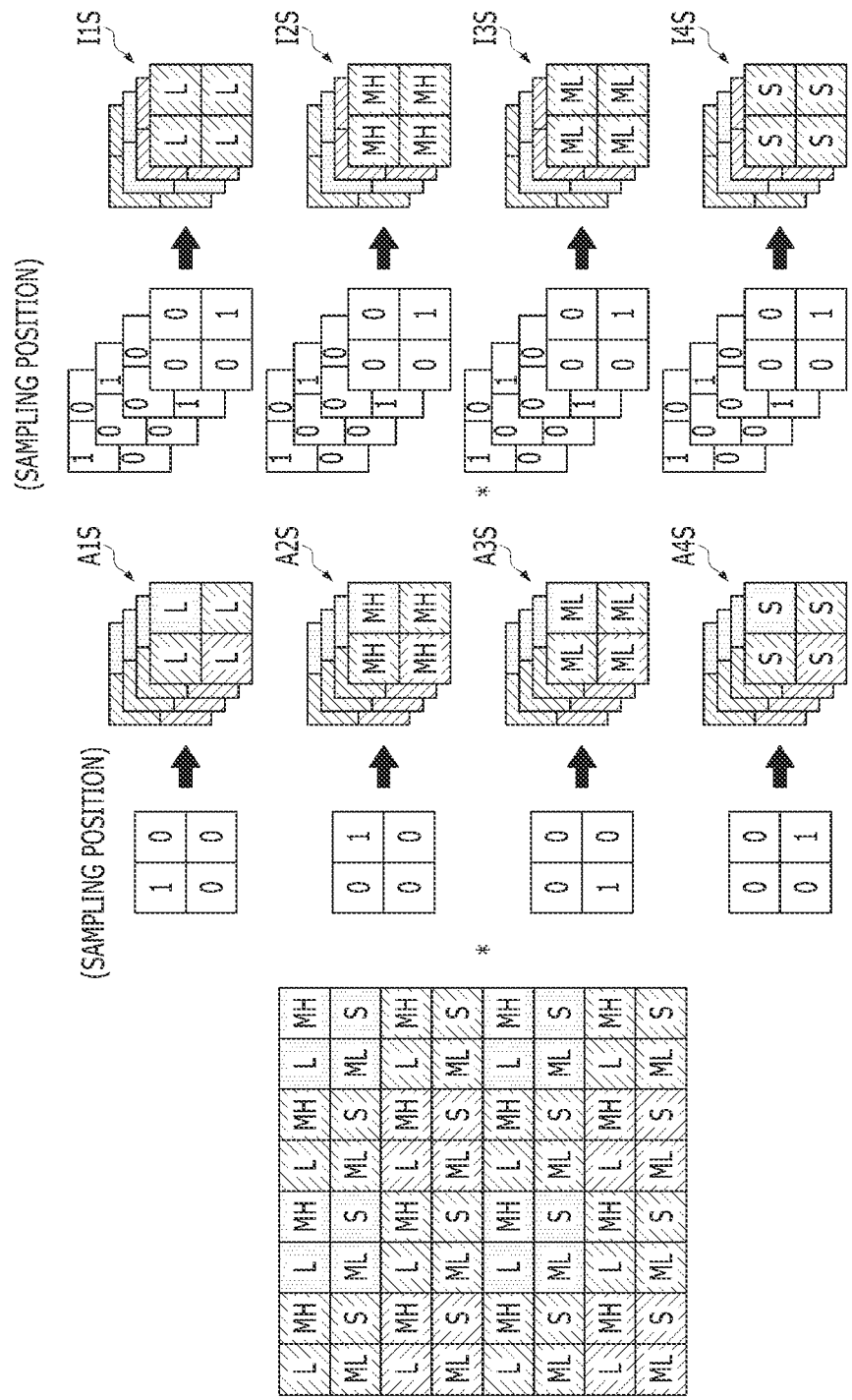

FIG. 9 is a diagram illustrating an operation of the sampling module 210 illustrated in FIGS. 3 and 4.

Referring to FIG. 9, the first sampling module 211 may sample, for each exposure time, the image values included in the single image SIMG, and generate the first to fourth sampled images A1S, A2S, A3S and A4S. For example, the first sampling module 211 may generate the first sampled images A1S by sampling image values of pixels, controlled according to the first exposure time L, among the image values included in the single image SIMG. Further, the first sampling module 211 may generate the second sampled images A2S by sampling image values of pixels, controlled according to the second exposure time MH, among the image values included in the single it mage SIMG. Furthermore, the first sampling module 211 may generate the third sampled images A3S by sampling image values of pixels, controlled according to the third exposure time ML, among the image values included in the single image SIMG. Furthermore, the first sampling module 211 may generate the fourth sampled images A4S by sampling image values of pixels, controlled according to the fourth exposure time 5, among the image values included in the single image SIMG.

The second sampling module 213 may sample, for each color, the image values included in the first to fourth sampled images A1S, A2S, A3S and A4S, and generate the first to fourth images I1S, I2S, I3S and I4S, For example, the second sampling module 213 may generate the first images I1S by sampling image values corresponding to the first green color among image values included in the first sampled images A1S, sampling image values corresponding to the red color among the image values included in the first sampled images A1S, sampling image values corresponding to the blue color among the image values included in the first sampled images A1S, and sampling image values corresponding to the second green color among the image values included in the first sampled images A1S. The second sampling module 213 may generate the second to fourth images I2S, I3S and I4S in the same manner as the method of generating the first images I1S.

For example, the first images I1S may include an image including the image values corresponding to the first green color among the image values of pixels controlled according to the first exposure time L. Further, the first images I1S may include an image including the image values corresponding to the red color among the image values of pixels controlled according to the first exposure time L. Furthermore, the first images I1S may include an image including the image values generated by the pixels having the blue color filter among the image values of pixels controlled according to the first exposure time L. Furthermore, the first images I1S may include an image including the image values corresponding to the second green color among the image values of pixels controlled according to the first exposure time L. The second images I2S may include an image including the image values corresponding to the first green color among the image values of pixels controlled according to the second exposure time MH. Further, the second images I2S may include an image including the image values corresponding to the red color among the image values of pixels controlled according to the second exposure time MH. Furthermore, the second images I2S may include an image including the image values generated by the pixels having the blue color lifter among the image values of pixels controlled according to the second exposure time MH. Furthermore, the second images I2S may include an image including the image values corresponding to the second green color among the image values of pixels controlled according to the second exposure time MH. The third images I3S may include an image including the image values corresponding to the first green color among the image values of pixels controlled according to the third exposure time ML. Further, the third images I3S may include an image including the image values corresponding to the red color among the image values of pixels controlled according to the third exposure time ML. Furthermore, the third images I3S may include an image including the image values generated by the pixels having the blue color filter among the image values of pixels controlled according to the third exposure time ML. Furthermore, the third images I3S may include an image including the image values corresponding to the second green color among the image values of pixels controlled according to the third exposure time ML. The fourth images I4S may include an image including the image values corresponding to the first green color among the image values of pixels controlled according to the fourth exposure time S. Further, the fourth images I4S may include an image including the image values corresponding to the red color among the image values of pixels controlled according to the fourth exposure time S. Furthermore, the fourth images I4S may include an image including the image values generated by the pixels having the blue color filter among the image values of pixels controlled according to fourth exposure time S. Furthermore, the fourth images I4S may include an image including the image values corresponding to the second green color among the image values of pixels controlled according to the fourth exposure time S.

Figure 10:
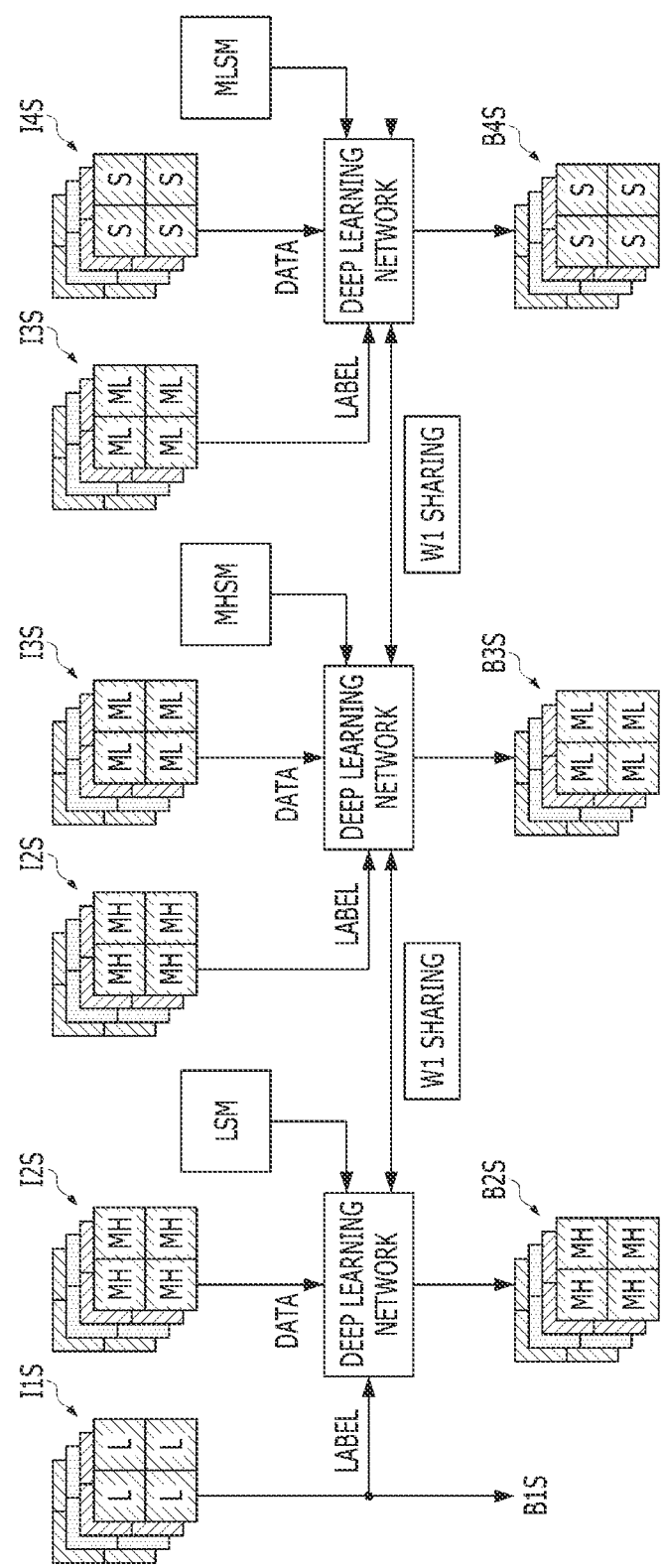

FIG. 10 is a diagram illustrating an operation of the denoise module 221 illustrated in FIGS. 5 and 6.

Referring to FIG. 10, the denoise module 221 may generate the first to fourth denoised images B1S, B2S, B3S and B4S corresponding to the first to fourth images I1S, I2S, I3S and I4S, respectively. In this case, the first images I1S may be outputted as the first denoised images B1S.

The first to third learning modules 2211, 2213 and 2215 may learn the second to fourth noise components of the single image SIMG, respectively, based on the first learning algorithm having a deep learning network structure. Further, the first to third learning modules 2211, 2213 and 2215 may generate the second to fourth denoised images B2S, B3S and B4S from which the second to fourth noise components are removed, respectively.

The first learning module 2211 may learn the second noise components corresponding to the respective second images I2S by using each of the first images I1S having a relatively long exposure time as a label and using each of the second images I2S having a relatively short exposure time as input data. In this case, the first learning module 2211 may generate first saturation maps LSM based on the first images I1S. The first learning module 2211 may recognize saturated image values among the image values included in the first images I1S, based on the first saturation maps LSM, and exclude, when learning the second noise components, image values corresponding to the saturated image values among the image values is included in the second images I2S. The first learning module 2211 may scale the second images I2S based on the first exposure ratio, before learning the second noise components.

The second learning module 2213 may learn the third noise components corresponding to the respective third images I3S by using each of the second images I2S having a relatively long exposure time as a label and using each of the third images I3S having a relatively short exposure time as input data. In this case, the second learning module 2213 may generate second saturation maps MHSM based on the second images I2S. The second learning module 2213 may recognize saturated image values among the image values included in the second images I2S, based on the second saturation maps MHSM, and exclude, when learning the third noise components, image values corresponding to the saturated image values among the it mage values included in the third images I3S. The second learning module 2213 may scale the third images I3S based on the second exposure ratio, before learning the third noise components.

The third learning module 2215 may learn the fourth noise components corresponding to the respective fourth images I4S by using each of the third images I3S having a relatively long exposure time as a label and using each of the fourth images MS having a relatively short exposure time as input data. In this case, the third learning module 2215 may generate third saturation maps MLSM based on the third images I3S. The third learning module 2215 may recognize saturated image values among the image values included in the third images I3S, based on the third saturation maps MLSM, and exclude, when learning the fourth noise components, image values corresponding to the saturated image values among the image values included in the fourth images I4S. The third learning module 2215 may scale the fourth images I4S based on the third exposure ratio, before learning the fourth noise components.

It may be seen that the first to third learning modules 2211, 2213 and 2215 use the first to third images I1S, I2S and I3S generated by the sampling module 210, respectively, as labels. That the denoise module 221 learns the second to fourth noise components through an unsupervised learning method.

Moreover, the first to third learning modules 2211, 2213 and 2215 may share a weight W1 for each color required when learning the second to fourth noise components, respectively. For example, the weight W1 may have a fixed value for each color.

Figure 11:
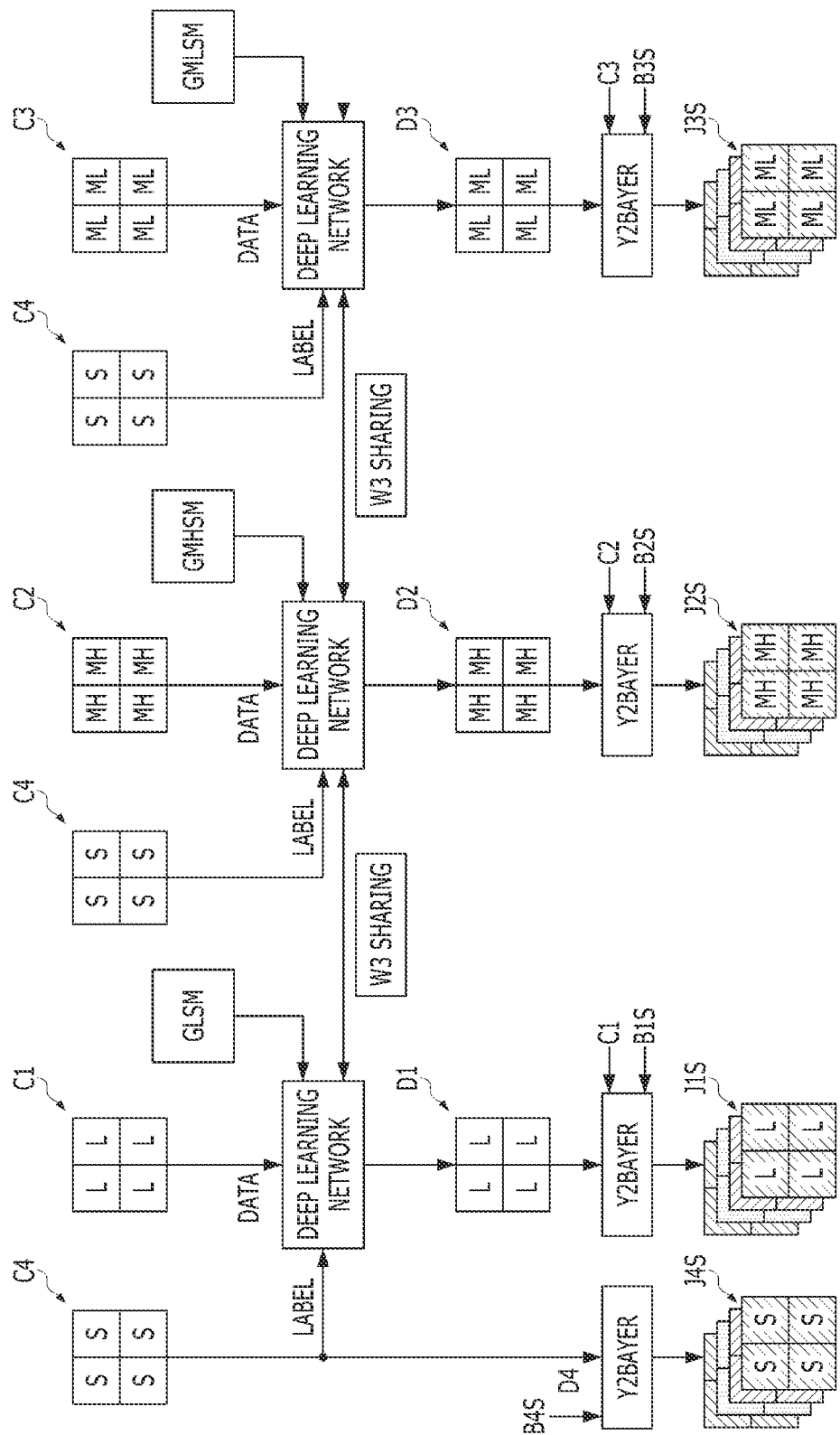

FIG. 11 is a diagram illustrating an operation of the deghost module 225 illustrated in FIGS. 5 and 7.

Referring to FIG. 11, the deghost module 225 may generate the first to fourth corrected images J1S, J2S, J3S and J4S based on the first to fourth gray images C1, C2, C3 and C4 and the first to fourth denoised images B1S, B2S, B3S and B4S.

The fourth to sixth learning modules 2251, 2253 and 2255 may learn the first to third ghost components, respectively, based on the second learning algorithm having a deep learning network structure, and generate the first to third corrected images J1S, J2S and J3S based on the first to third ghost components.

The fourth learning module 2251 may learn the first ghost component corresponding to the first gray image C1 by using the fourth gray image C4 having the shortest exposure time as a label, and using the first gray image C1 having a relatively long exposure time as input data, in this case, the fourth learning module 2251 may generate a fourth saturation map GLSM based on the first gray image C1. The fourth learning module 2251 may exclude, when learning the first ghost component, saturated image values among image values included in the first gray image C1, based on the fourth saturation map GLSM. The fourth learning module 2251 may scale the first gray image C1 based on the fourth exposure ratio, before learning the first ghost component.

The fifth learning module 2253 may learn the second ghost component corresponding to the second gray image C2 by using the fourth gray image C4 having the shortest exposure time as a label, and using the second gray image C2 having a relatively long exposure time as input data. In this case, the fifth learning module 2253 may generate a fifth saturation map GMHSM based on the second gray image C2. The fifth learning module 2253 may exclude, when learning the second ghost component, saturated image values among image values included in the second gray image C2, based on the fifth saturation map GMHSM. The fifth learning module 2253 may scale the second gray image C2 based on the fifth exposure ratio, before learning the second ghost component.

The sixth learning module 2255 may learn the third ghost component corresponding to the third gray image C3 by using the fourth gray image C4 having the shortest exposure time as a label, and using the third gray image C3 having a relatively long exposure time as input data. In this case, the sixth learning module 2255 may generate a sixth saturation map GMLSM based on the third gray image C3, The sixth learning module 2255 may exclude, when learning the third ghost component, saturated image values among image values included in the third gray image C3, based on the sixth saturation map GMLSM. The sixth learning module 2255 may scale the third gray image C3 based on the sixth exposure ratio, before learning the third ghost component.

It may be seen that each of the fourth to sixth learning modules 2251, 2253 and 2255 uses the fourth gray image C4 generated by the calculation module 223 as a label. That is, the deghost module 225 learns the first to third ghost components through the unsupervised learning method.

Moreover, the fourth to sixth learning modules 2251, 2253 and 2255 may share a weight W3 required when learning the first to third ghost components, respectively. For example, the weight W3 may have a fixed value.

The first to fourth generation modules 2252, 2254, 2256 and 2257 may generate the first to fourth corrected images J1S, J2S, J3S and J4S, respectively, based on a predetermined algorithm Y2Bayer. The predetermined algorithm Y2Bayer may be "Equation 5", "Equation 7", "Equation 9" or "Equation 10" above.

The first generation module 2252 may generate the first corrected images J1S based on the first corrected gray image D1, the first gray image C1 and the first denoised images B1S according to Equation 5 above.

The second generation module 2254 may generate the second corrected images J2S based on the second corrected gray image D2, the second gray image C2 and the second denoised images B2S according to Equation 7 above.

The third generation module 2256 may generate the third corrected images J3S based on the third corrected gray image D3, the third gray image C3 and the third denoised images 635 according to Equation 9 above.

The fourth generation module 2257 may generate the fourth corrected images J4S based on the fourth corrected gray image D4, the fourth gray image C4 and the fourth denoised images B4s according to Equation 10 above.

FIG. 12 is a diagram illustrating an operation of the fusion module 231 illustrated in FIG. 8.

Referring to FIG. 12, the fusion module 231 may generate the fusion image FIMG corresponding to the single image SIMG by synthesizing the first to fourth image values having the same color and disposed at the same position from the first to fourth corrected images J1S, J2S, J3S and J4S. For example, the fusion module 231 may generate one image value corresponding to the first green color among image values included in the fusion image FIMG, by synthesizing one image value corresponding to the first green color among image values included in the first corrected images J1S, one image value corresponding to the first green color among image values included in the second corrected images J2S, one image value corresponding to the first green color among image values included in the third corrected images J3S, and one image value corresponding to the first green color among image values included in the fourth corrected images 745. The fusion module 231 may generate the fusion image FIMG having a size of 4×4 and corresponding to the single image SIMG having a size of 8×8.

According to an embodiment of the present disclosure, noise components and ghost components may be learned and removed using a deep learning network when synthesizing images.

According to an embodiment of the present disclosure, a high dynamic range image may be generated based on deep learning, thereby removing a signal-to-noise ratio dip and a motion artifact that occur when generating the high dynamic range image.

While the present disclosure has been illustrated and described with respect to a specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image sensing device comprising:
a sampling module suitable for generating for each color, a plurality of images having different exposure times, based on a single image generated during a single frame time;
a correction module suitable for learning correction parameters of the single image based on the plurality of images using a set learning algorithm, and generating a plurality of corrected images by removing the correction parameters from the plurality of images; and
an image processing module suitable for generating a high dynamic range image corresponding to the single image, based on the plurality of corrected images.

2. The image sensing device of claim 1, wherein the correction parameters include noise components and ghost components.

3. The image sensing device of claim 1, wherein the correction module includes:
a denoise module suitable for learning a noise component of each of the plurality of images based on the plurality of images using a first learning algorithm, and generating a plurality of denoised images by removing the noise component from each of the plurality of images;
a calculation module suitable for generating a plurality of gray images based on the plurality of denoised images and weights for each color; and
a deghost module suitable for learning a ghost component of each of the plurality of gray images based on the plurality of gray images using a second learning algorithm, and generating the plurality of corrected images by removing the noise component from each of the plurality of gray images.

4. The image sensing device of claim 3, wherein the denoise module generates a plurality of first images each having a first exposure time for each color as a plurality of first denoised images, and the denoise module includes:
a first learning module suitable for generating a plurality of second denoised images corresponding to a plurality of second images each having a second exposure time for each color, based on the plurality of first images and the plurality of second images;
a second learning module suitable for generating a plurality of third denoised images corresponding to a plurality of third images each having a third exposure time for each color, based on the plurality of second images and the plurality of third images; and
a third learning module suitable for generating a plurality of fourth denoised images corresponding to a plurality of fourth images each having a fourth exposure time for each color, based on the plurality of third images and the plurality of fourth images.

5. The image sensing device of claim 4, wherein the first learning module learns a noise component of each of the plurality of second images by using each of the plurality of first images as a label and using each of the plurality of second images as input data,
the second learning module learns a noise component of each of the plurality of third images by using each of the plurality of second images as a label and using each of the plurality of third images as input data, and
the third learning module learns a noise component of each of the plurality of fourth images by using each of the plurality of third it mages as a label and using each of the plurality of fourth images as input data.

6. The image sensing device of claim 5, wherein the first learning module generates and uses a first saturation map corresponding to the plurality of first images, when learning the noise component of each of the plurality of second images,
the second learning module generates and uses a second saturation map corresponding to the plurality of second images, when learning the noise component of each of the plurality of third images, and the third learning module generates and uses a third saturation map corresponding to the plurality of third images, when learning the noise component of each of the plurality of fourth images.

7. The image sensing device of claim 4, wherein the first learning module scales the plurality of second images based on a first exposure ratio, before learning a noise component of each of the plurality of second images, the second learning module scales the plurality of third images based on a second exposure ratio, before learning a noise component of each of the plurality of third images, and the third learning module scales the plurality of fourth images based on a third exposure ratio, before learning a noise component of each of the plurality of fourth images.

8. The image sensing device of claim 4, wherein among the first to fourth exposure times, the first exposure time is the longest exposure time, the second exposure time is shorter than the first exposure time, the third exposure time is shorter than the second exposure time, and the fourth exposure time is the shortest exposure time.

9. The image sensing device of claim 4, wherein the first to third learning modules share a weight for each color used for learning the respective noise components.

10. The image sensing device of claim 3, wherein the denoise module includes:
a fourth learning module suitable for generating a first corrected gray image corresponding to a first gray image having a first exposure time, based on a fourth gray image having a fourth exposure time and the first gray image;
a first generation module suitable for generating a plurality of first corrected images having the first exposure time for each color, based on the first corrected gray image;
a fifth learning module suitable for generating a second corrected gray image corresponding to a second gray image having a second exposure time, based on the fourth gray image and the second gray image;
a second generation module suitable for generating a plurality of second corrected images having the second exposure time for each color, based on the second corrected gray image;
a sixth learning module suitable for generating a third corrected gray image corresponding to a third gray image having a third exposure time, based on the fourth gray image and the third gray image;
a third generation module suitable for generating a plurality of third corrected images having the third exposure time for each color, based on the third corrected gray image; and
a fourth generation module suitable for generating a plurality of fourth corrected images having the fourth exposure time for each color, based on the fourth gray image.

11. The image sensing device of claim 10, wherein the fourth learning module learns a ghost component of the first gray image by using the fourth gray image as a label and using the first gray image as input data, the fifth learning module learns a ghost component of the second gray image by using the fourth gray image as a label and using the second gray image as input data, and the sixth learning module learns a ghost component of the third gray image by using the fourth gray image as a label and using the third gray image as input data.

12. The image sensing device of claim 11, wherein the fourth learning module generates and uses a fourth saturation map corresponding to the first gray image, when learning the ghost component of the first gray image, the fifth learning module generates and uses a fifth saturation map corresponding to the second gray image, when learning the ghost component of the second gray image, and the sixth learning module generates and uses a sixth saturation map corresponding to the third gray image, when learning the ghost component of the third gray image.

13. The image sensing device of claim 10, wherein the fourth learning module scales the first gray image based on a fourth exposure ratio, before learning a ghost component of the first gray image, the fifth learning module scales the second gray image based on a fifth exposure ratio, before learning a ghost component of the second gray image, and the sixth learning module scales the third gray image based on a sixth exposure ratio, before learning a ghost component of the third gray image.

14. The image sensing device of claim 10, wherein among the first to fourth exposure times, the first exposure time is the longest exposure time, the second exposure time is shorter than the first exposure time, the third exposure time is shorter than the second exposure time, and the fourth exposure time is the shortest exposure time.

15. The image sensing device of claim 10, wherein the fourth to sixth learning modules share a weight for each color used for learning the respective ghost components.

16. The image sensing device of claim 1, wherein the sampling module includes:
a first sampling module suitable for sampling, for each exposure time, image values included in the single image, and generating a plurality of sampled images; and
a second sampling module suitable for sampling, for each color, image values included in the plurality of sampled images, and generating the plurality of images.

17. The image sensing device of claim 1, wherein the image processing module includes:
a fusion module suitable for generating a single fusion image by synthesizing the plurality of corrected images for each color; and
a tone mapping module suitable for generating the high dynamic range image based on the single fusion image.

18. An image sensing device comprising:
an image sensor including a pixel array having color filters arranged in a quad pattern and controlled according to different exposure times for each pattern, and suitable for generating a single image corresponding to the quad pattern during a single frame time; and
an image processor suitable for learning, for each color, correction parameters based on the single image and a set learning algorithm, and generating a high dynamic range image having a Bayer pattern, based on the correction parameters.

19. The image sensing device of claim 18, wherein the correction parameters include noise components and ghost components.

20. An image processing device comprising
a sampling module suitable for receiving a quad pattern image and sampling the quad pattern image according to color channels to generate a plurality of channel images;
a denoising module suitable for generating a plurality of denoised channel images, each denoised channel image generated by learning using a pair of images of own and another channels, the another channel associated with a relatively high exposure time;
a deghosting module suitable for generating a plurality of deghosted channel images, each deghosted channel image generated by learning using a pair of images of own and another select channels, the another select channel associated with a lowest exposure time; and
an image processing module suitable for generating an output image with a Bayer pattern based on the plurality of deghosted channel images.

* * * * *